(12) United States Patent
Gass

(10) Patent No.: US 8,100,039 B2
(45) Date of Patent: Jan. 24, 2012

(54) MITER SAW WITH SAFETY SYSTEM

(75) Inventor: Stephen F. Gass, West Linn, OR (US)

(73) Assignee: SD3, LLC, Tualatin, OR (US)

( * ) Notice: Subject to any disclaimer, the term of this patent is extended or adjusted under 35 U.S.C. 154(b) by 0 days.

(21) Appl. No.: 12/799,211

(22) Filed: Apr. 19, 2010

(65) Prior Publication Data

US 2010/0263509 A1 Oct. 21, 2010

Related U.S. Application Data

(63) Continuation of application No. 12/220,946, filed on Jul. 29, 2008, now Pat. No. 7,698,976, which is a continuation of application No. 09/929,238, filed on Aug. 13, 2001, now abandoned.

(60) Provisional application No. 60/225,056, filed on Aug. 14, 2000, provisional application No. 60/225,057, filed on Aug. 14, 2000, provisional application No. 60/225,058, filed on Aug. 14, 2000, provisional application No. 60/225,059, filed on Aug. 14, 2000, provisional application No. 60/225,089, filed on Aug. 14, 2000, provisional application No. 60/225,094, filed on Aug. 14, 2000, provisional application No. 60/225,169, filed on Aug. 14, 2000, provisional application No. 60/225,170, filed on Aug. 14, 2000, provisional application No. 60/225,200, filed on Aug. 14, 2000, provisional application No. 60/225,201, filed on Aug. 14, 2000, provisional application No. 60/225,206, filed on Aug. 14, 2000, provisional application No. 60/225,210, filed on Aug. 14, 2000, provisional application No. 60/225,211, filed on Aug. 14, 2000, provisional application No. 60/225,212, filed on Aug. 14, 2000.

(51) Int. Cl.
*B26D 5/00* (2006.01)
*B26D 1/14* (2006.01)
*B27B 5/18* (2006.01)

(52) U.S. Cl. ............ 83/62.1; 83/58; 83/397.1; 83/471.2; 83/471.3; 83/478; 83/490; 83/581; 83/477.1

(58) Field of Classification Search ............. 83/58, 62.1, 83/477.1, DIG. 1, 488, 397, 544, 581, 473, 83/778, 76.8, 397.1, 471.2, 471.3, 490, 76.7, 83/485, 487; 144/356, 154, 365, 117.1, 118, 144/352
See application file for complete search history.

(56) References Cited

U.S. PATENT DOCUMENTS 146,886 A 1/1874 Doane et al.
(Continued)

FOREIGN PATENT DOCUMENTS

CH 297525 6/1954
(Continued)

OTHER PUBLICATIONS

Gordon Engineering Corp., Product Catalog, pp. cover, 1, 3 and back, Brookfield, Connecticut, US, Oct. 1997.
(Continued)

*Primary Examiner* — Ghassem Alie

(57) ABSTRACT

A miter saw is disclosed having a base, a blade supported by the base, a detection system adapted to detect a dangerous condition between a person and the blade, and a reaction system associated with the detection system to cause a predetermined action to take place upon detection of the dangerous condition. The blade is rotatable, and moves into a cutting zone to cut a workpiece. The predetermined action may be to retract the blade from the cutting zone.

2 Claims, 6 Drawing Sheets

U.S. PATENT DOCUMENTS

| | | | |
|---|---|---|---|
| 162,814 A | 5/1875 | Graves et al. |
| 261,090 A | 7/1882 | Grill |
| 264,412 A | 9/1882 | Kuhlmann |
| 299,480 A | 5/1884 | Kuhlman et al. |
| 302,041 A | 7/1884 | Sill |
| 307,112 A | 10/1884 | Groff |
| 509,253 A | 11/1893 | Shields |
| 545,504 A | 9/1895 | Hoover |
| 869,513 A | 10/1907 | Pfeil |
| 941,726 A | 11/1909 | Pfalzgraf |
| 997,720 A | 7/1911 | Troupenat |
| 1,037,843 A | 9/1912 | Ackley |
| 1,050,649 A | 1/1913 | Harrold et al. |
| 1,054,558 A | 2/1913 | Jones |
| 1,074,198 A | 9/1913 | Phillips |
| 1,082,870 A | 12/1913 | Humason |
| 1,101,515 A | 6/1914 | Adam |
| 1,126,970 A | 2/1915 | Folmer |
| 1,132,129 A | 3/1915 | Stevens |
| 1,148,169 A | 7/1915 | Howe |
| 1,154,209 A | 9/1915 | Rushton |
| 1,205,246 A | 11/1916 | Mowry |
| 1,228,047 A | 5/1917 | Reinhold |
| 1,240,430 A | 9/1917 | Erickson |
| 1,244,187 A | 10/1917 | Frisbie |
| 1,255,886 A | 2/1918 | Jones |
| 1,258,961 A | 3/1918 | Tattersall |
| 1,311,508 A | 7/1919 | Harrold |
| 1,324,136 A | 12/1919 | Turner |
| 1,381,612 A | 6/1921 | Anderson |
| 1,397,606 A | 11/1921 | Smith |
| 1,427,005 A | 8/1922 | McMichael |
| 1,430,983 A | 10/1922 | Granberg |
| 1,464,924 A | 8/1923 | Drummond |
| 1,465,224 A | 8/1923 | Lantz |
| 1,496,212 A | 6/1924 | French |
| 1,511,797 A | 10/1924 | Berghold |
| 1,526,128 A | 2/1925 | Flohr |
| 1,527,587 A | 2/1925 | Hutchinson |
| 1,551,900 A | 9/1925 | Morrow |
| 1,553,996 A | 9/1925 | Federer |
| 1,582,483 A | 4/1926 | Runyan |
| 1,600,604 A | 9/1926 | Sorlien |
| 1,616,478 A | 2/1927 | Watson |
| 1,640,517 A | 8/1927 | Procknow |
| 1,662,372 A | 3/1928 | Ward |
| 1,701,948 A | 2/1929 | Crowe |
| 1,711,490 A | 5/1929 | Drummond |
| 1,712,828 A | 5/1929 | Klehm |
| 1,774,521 A | 9/1930 | Neighbour |
| 1,807,120 A | 5/1931 | Lewis |
| 1,811,066 A | 6/1931 | Tannewitz |
| 1,879,280 A | 9/1932 | James |
| 1,896,924 A | 2/1933 | Ulrich |
| 1,902,270 A | 3/1933 | Tate |
| 1,904,005 A | 4/1933 | Masset |
| 1,910,651 A | 5/1933 | Tautz |
| 1,938,548 A | 12/1933 | Tautz |
| 1,938,549 A | 12/1933 | Tautz |
| 1,963,688 A | 6/1934 | Tautz |
| 1,988,102 A | 1/1935 | Woodward |
| 1,993,219 A | 3/1935 | Merrigan |
| 2,007,887 A | 7/1935 | Tautz |
| 2,010,851 A | 8/1935 | Drummond |
| 2,020,222 A | 11/1935 | Tautz |
| 2,038,810 A | 4/1936 | Tautz |
| 2,075,282 A | 3/1937 | Hedgpeth |
| 2,095,330 A | 10/1937 | Hedgpeth |
| 2,106,288 A | 1/1938 | Tautz |
| 2,106,321 A | 1/1938 | Guertin |
| 2,121,069 A | 6/1938 | Collins |
| 2,131,492 A | 9/1938 | Ocenasek |
| 2,163,320 A | 6/1939 | Hammond |
| 2,168,282 A | 8/1939 | Tautz |
| 2,241,556 A | 5/1941 | MacMillin et al. |
| 2,261,696 A | 11/1941 | Ocenasek |
| 2,265,407 A | 12/1941 | Tautz |
| 2,286,589 A | 6/1942 | Tannewitz |
| 2,292,872 A | 8/1942 | Eastman |
| 2,299,262 A | 10/1942 | Uremovich |
| 2,312,118 A | 2/1943 | Neisewander |
| 2,313,686 A | 3/1943 | Uremovich |
| 2,328,244 A | 8/1943 | Woodward |
| 2,352,235 A | 6/1944 | Tautz |
| 2,377,265 A | 3/1945 | Rady |
| 2,402,232 A | 6/1946 | Baker |
| 2,425,331 A | 8/1947 | Kramer |
| 2,434,174 A | 1/1948 | Morgan |
| 2,452,589 A | 11/1948 | McWhirter et al. |
| 2,466,325 A | 4/1949 | Ocenasek |
| 2,496,613 A | 2/1950 | Woodward |
| 2,509,813 A | 5/1950 | Dineen |
| 2,517,649 A | 8/1950 | Frechtmann |
| 2,518,684 A | 8/1950 | Harris |
| 2,530,290 A | 11/1950 | Collins |
| 2,554,124 A | 5/1951 | Salmont |
| 2,562,396 A | 7/1951 | Schutz |
| 2,572,326 A | 10/1951 | Evans |
| 2,590,035 A | 3/1952 | Pollak |
| 2,593,596 A | 4/1952 | Olson |
| 2,601,878 A | 7/1952 | Anderson |
| 2,623,555 A | 12/1952 | Eschenburg |
| 2,625,966 A | 1/1953 | Copp |
| 2,626,639 A | 1/1953 | Hess |
| 2,661,777 A | 12/1953 | Hitchcock |
| 2,661,780 A | 12/1953 | Morgan |
| 2,675,707 A | 4/1954 | Brown |
| 2,678,071 A | 5/1954 | Odlum et al. |
| 2,690,084 A | 9/1954 | Van Dam |
| 2,695,638 A | 11/1954 | Gaskell |
| 2,704,560 A | 3/1955 | Woessner |
| 2,711,762 A | 6/1955 | Gaskell |
| 2,722,246 A | 11/1955 | Arnoldy |
| 2,731,049 A | 1/1956 | Akin |
| 2,736,348 A | 2/1956 | Nelson |
| 2,737,213 A | 3/1956 | Richards et al. |
| 2,758,615 A | 8/1956 | Mastriforte |
| 2,785,710 A | 3/1957 | Mowery, Jr. |
| 2,786,496 A | 3/1957 | Eschenburg |
| 2,810,408 A | 10/1957 | Boice et al. |
| 2,844,173 A | 7/1958 | Gaskell |
| 2,850,054 A | 9/1958 | Eschenburg |
| 2,851,068 A * | 9/1958 | Goodlet ..................... 83/471.3 |
| 2,852,047 A | 9/1958 | Odlum et al. |
| 2,873,773 A | 2/1959 | Gaskell |
| 2,883,486 A | 4/1959 | Mason |
| 2,894,546 A | 7/1959 | Eschenburg |
| 2,913,025 A | 11/1959 | Richards |
| 2,945,516 A | 7/1960 | Edgemond, Jr. et al. |
| 2,954,118 A | 9/1960 | Anderson |
| 2,957,166 A | 10/1960 | Gluck |
| 2,978,084 A | 4/1961 | Vilkaitis |
| 2,984,268 A | 5/1961 | Vuichard |
| 2,991,593 A | 7/1961 | Cohen |
| 3,005,477 A | 10/1961 | Sherwen |
| 3,011,529 A | 12/1961 | Copp |
| 3,011,610 A | 12/1961 | Stiebel et al. |
| 3,013,592 A | 12/1961 | Ambrosio et al. |
| 3,021,881 A | 2/1962 | Edgemond, Jr. et al. |
| 3,035,995 A | 5/1962 | Seeley et al. |
| 3,047,116 A | 7/1962 | Stiebel et al. |
| 3,085,602 A | 4/1963 | Gaskell |
| 3,105,528 A * | 10/1963 | Loughridge ................. 83/468.3 |
| 3,105,530 A | 10/1963 | Peterson |
| 3,129,731 A | 4/1964 | Tyrrell |
| 3,163,732 A | 12/1964 | Abbott |
| 3,184,001 A | 5/1965 | Reinsch et al. |
| 3,186,256 A | 6/1965 | Reznick |
| 3,207,273 A | 9/1965 | Jurin |
| 3,224,474 A | 12/1965 | Bloom |
| 3,232,326 A | 2/1966 | Speer et al. |
| 3,246,205 A | 4/1966 | Miller |
| 3,249,134 A | 5/1966 | Vogl et al. |
| 3,306,149 A | 2/1967 | John |
| 3,313,185 A | 4/1967 | Drake et al. |
| 3,315,715 A | 4/1967 | Mytinger |
| 3,323,814 A | 6/1967 | Phillips |

| Patent | Date | Name | | Patent | Date | Name |
|---|---|---|---|---|---|---|
| 3,337,008 A | 8/1967 | Trachte | | 4,372,202 A | 2/1983 | Cameron |
| 3,356,111 A | 12/1967 | Mitchell | | 4,391,358 A | 7/1983 | Haeger |
| 3,386,322 A | 6/1968 | Stone et al. | | 4,418,597 A | 12/1983 | Krusemark et al. |
| 3,439,183 A | 4/1969 | Hurst, Jr. | | 4,453,112 A | 6/1984 | Sauer et al. |
| 3,454,286 A | 7/1969 | Anderson et al. | | 4,466,233 A | 8/1984 | Thesman |
| 3,538,964 A | 11/1970 | Warrick et al. | | 4,470,046 A | 9/1984 | Betsill |
| 3,540,338 A | 11/1970 | McEwan et al. | | 4,510,489 A | 4/1985 | Anderson, III et al. |
| 3,554,067 A | 1/1971 | Scutella | | 4,512,224 A | 4/1985 | Terauchi |
| 3,566,996 A | 3/1971 | Crossman | | 4,518,043 A | 5/1985 | Anderson et al. |
| 3,580,376 A | 5/1971 | Loshbough | | 4,532,501 A | 7/1985 | Hoffman |
| 3,581,784 A | 6/1971 | Warrick | | 4,532,844 A | 8/1985 | Chang et al. |
| 3,613,748 A | 10/1971 | De Pue | | 4,557,168 A | 12/1985 | Tokiwa |
| 3,670,788 A | 6/1972 | Pollak et al. | | 4,560,033 A | 12/1985 | DeWoody et al. |
| 3,675,444 A | 7/1972 | Whipple | | 4,566,512 A | 1/1986 | Wilson |
| 3,680,609 A | 8/1972 | Menge | | 4,573,556 A | 3/1986 | Andreasson |
| 3,688,815 A | 9/1972 | Ridenour | | 4,576,073 A | 3/1986 | Stinson |
| 3,695,116 A | 10/1972 | Baur | | 4,589,047 A | 5/1986 | Gaus et al. |
| 3,696,844 A | 10/1972 | Bernatschek | | 4,589,860 A | 5/1986 | Brandenstein et al. |
| 3,745,546 A | 7/1973 | Struger et al. | | 4,599,597 A | 7/1986 | Rotbart |
| 3,749,933 A | 7/1973 | Davidson | | 4,599,927 A | 7/1986 | Eccardt et al. |
| 3,754,493 A | 8/1973 | Niehaus et al. | | 4,606,251 A | 8/1986 | Boileau |
| 3,772,590 A | 11/1973 | Mikulecky et al. | | 4,615,247 A | 10/1986 | Berkeley |
| 3,785,230 A | 1/1974 | Lokey | | 4,621,300 A | 11/1986 | Summerer |
| 3,805,639 A | 4/1974 | Peter | | 4,625,604 A | 12/1986 | Handler et al. |
| 3,805,658 A | 4/1974 | Scott et al. | | 4,637,188 A | 1/1987 | Crothers |
| 3,808,932 A | 5/1974 | Russell | | 4,637,289 A | 1/1987 | Ramsden |
| 3,829,850 A | 8/1974 | Guetersloh | | 4,644,832 A | 2/1987 | Smith |
| 3,858,095 A | 12/1974 | Friemann et al. | | 4,653,189 A | 3/1987 | Andreasson |
| 3,861,016 A | 1/1975 | Johnson et al. | | 4,657,428 A | 4/1987 | Wiley |
| 3,863,208 A | 1/1975 | Balban | | 4,672,500 A | 6/1987 | Tholome et al. |
| 3,880,032 A | 4/1975 | Green | | 4,679,719 A | 7/1987 | Kramer |
| 3,882,744 A | 5/1975 | McCarroll | | 4,694,721 A | 9/1987 | Brickner, Jr. |
| 3,886,413 A | 5/1975 | Dow et al. | | 4,722,021 A | 1/1988 | Hornung et al. |
| 3,889,567 A | 6/1975 | Sato et al. | | 4,751,603 A | 6/1988 | Kwan |
| 3,922,785 A | 12/1975 | Fushiya | | 4,756,220 A | 7/1988 | Olsen et al. |
| 3,924,688 A | 12/1975 | Cooper et al. | | 4,757,881 A | 7/1988 | Jonsson et al. |
| 3,931,727 A | 1/1976 | Luenser | | 4,774,866 A | 10/1988 | Dehari et al. |
| 3,935,777 A | 2/1976 | Bassett | | 4,792,965 A | 12/1988 | Morgan |
| 3,945,286 A | 3/1976 | Smith | | 4,805,504 A | 2/1989 | Fushiya et al. |
| 3,946,631 A | 3/1976 | Malm | | 4,840,135 A | 6/1989 | Yamauchi |
| 3,947,734 A | 3/1976 | Fyler | | 4,864,455 A | 9/1989 | Shimomura et al. |
| 3,949,636 A | 4/1976 | Ball et al. | | 4,875,398 A | 10/1989 | Taylor et al. |
| 3,953,770 A | 4/1976 | Hayashi | | 4,896,607 A | 1/1990 | Hall et al. |
| 3,967,161 A | 6/1976 | Lichtblau | | 4,906,962 A | 3/1990 | Duimstra |
| 3,974,565 A | 8/1976 | Ellis | | 4,934,233 A | 6/1990 | Brundage et al. |
| 3,975,600 A | 8/1976 | Marston | | 4,936,876 A | 6/1990 | Reyes |
| 3,994,192 A | 11/1976 | Faig | | 4,937,554 A | 6/1990 | Herman |
| 4,007,679 A | 2/1977 | Edwards | | 4,965,909 A | 10/1990 | McCullough et al. |
| 4,016,490 A | 4/1977 | Weckenmann et al. | | 4,975,798 A | 12/1990 | Edwards et al. |
| 4,026,174 A | 5/1977 | Fierro | | 5,020,406 A | 6/1991 | Sasaki et al. |
| 4,026,177 A | 5/1977 | Lokey | | 5,025,175 A | 6/1991 | Dubois, III |
| 4,029,159 A | 6/1977 | Nymann | | 5,042,348 A | 8/1991 | Brundage et al. |
| 4,047,156 A | 9/1977 | Atkins | | 5,046,426 A | 9/1991 | Julien et al. |
| 4,048,886 A | 9/1977 | Zettler | | 5,052,255 A | 10/1991 | Gaines |
| 4,060,160 A | 11/1977 | Lieber | | 5,074,047 A | 12/1991 | King |
| 4,070,940 A | 1/1978 | McDaniel et al. | | 5,081,406 A | 1/1992 | Hughes et al. |
| 4,075,961 A | 2/1978 | Harris | | 5,082,316 A | 1/1992 | Wardlaw |
| 4,077,161 A | 3/1978 | Wyle et al. | | 5,083,973 A | 1/1992 | Townsend |
| 4,085,303 A | 4/1978 | McIntyre et al. | | 5,086,890 A | 2/1992 | Turczyn et al. |
| 4,090,345 A | 5/1978 | Harkness | | 5,094,000 A | 3/1992 | Becht et al. |
| 4,091,698 A | 5/1978 | Obear et al. | | 5,119,555 A | 6/1992 | Johnson |
| 4,106,378 A | 8/1978 | Kaiser | | 5,122,091 A | 6/1992 | Townsend |
| 4,117,752 A | 10/1978 | Yoneda | | 5,129,300 A | 7/1992 | Kawakami |
| 4,145,940 A | 3/1979 | Woloveke et al. | | 5,174,349 A | 12/1992 | Svetlik et al. |
| 4,152,833 A | 5/1979 | Phillips | | 5,184,534 A | 2/1993 | Lee |
| 4,161,649 A | 7/1979 | Klos et al. | | 5,198,702 A | 3/1993 | McCullough et al. |
| 4,175,452 A | 11/1979 | Idel | | 5,199,343 A | 4/1993 | O'Banion |
| 4,190,000 A | 2/1980 | Shaull et al. | | 5,201,684 A | 4/1993 | DeBois, III |
| 4,195,722 A | 4/1980 | Anderson et al. | | 5,207,253 A | 5/1993 | Hoshino et al. |
| 4,199,930 A | 4/1980 | Lebet et al. | | 5,212,621 A | 5/1993 | Panter |
| 4,249,117 A | 2/1981 | Leukhardt et al. | | 5,218,189 A | 6/1993 | Hutchison |
| 4,249,442 A | 2/1981 | Fittery | | 5,231,359 A | 7/1993 | Masuda et al. |
| 4,262,278 A | 4/1981 | Howard et al. | | 5,231,906 A | 8/1993 | Kogej |
| 4,267,914 A | 5/1981 | Saar | | 5,239,978 A | 8/1993 | Plangetis |
| 4,270,427 A | 6/1981 | Colberg et al. | | 5,245,879 A | 9/1993 | McKeon |
| 4,276,799 A | 7/1981 | Muehling | | 5,257,570 A | 11/1993 | Shiotani et al. |
| 4,291,794 A | 9/1981 | Bauer | | 5,265,510 A | 11/1993 | Hoyer-Ellefsen |
| 4,305,442 A | 12/1981 | Currie | | 5,272,946 A * | 12/1993 | McCullough et al. ............ 83/58 |
| 4,321,841 A | 3/1982 | Felix | | 5,276,431 A | 1/1994 | Piccoli et al. |

| | | | | | | |
|---|---|---|---|---|---|---|
| 5,285,708 | A | 2/1994 | Bosten et al. | 6,460,442 | B2 | 10/2002 | Talesky et al. |
| 5,297,463 | A | 3/1994 | O'Banion et al. | 6,471,106 | B1 | 10/2002 | Reining |
| 5,320,382 | A | 6/1994 | Goldstein et al. | 6,479,958 | B1 | 11/2002 | Thompson et al. |
| 5,321,230 | A | 6/1994 | Shanklin et al. | D466,913 | S | 12/2002 | Ceroll et al. |
| 5,331,875 | A | 7/1994 | Mayfield | 6,492,802 | B1 | 12/2002 | Bielski |
| 5,353,670 | A | 10/1994 | Metzger, Jr. | D469,354 | S | 1/2003 | Curtsinger |
| 5,375,495 | A * | 12/1994 | Bosten et al. ............ 83/520 | 6,502,493 | B1 | 1/2003 | Eccardt et al. |
| 5,377,554 | A | 1/1995 | Reulein et al. | 6,536,536 | B1 | 3/2003 | Gass et al. |
| 5,377,571 | A | 1/1995 | Josephs | 6,543,324 | B2 | 4/2003 | Dils |
| 5,392,678 | A | 2/1995 | Sasaki et al. | 6,546,835 | B2 | 4/2003 | Wang |
| 5,401,928 | A | 3/1995 | Kelley | 6,575,067 | B2 | 6/2003 | Parks et al. |
| 5,411,221 | A | 5/1995 | Collins et al. | 6,578,460 | B2 | 6/2003 | Sartori |
| 5,451,750 | A | 9/1995 | An | 6,578,856 | B2 | 6/2003 | Kahle |
| 5,453,903 | A | 9/1995 | Chow | 6,595,096 | B2 | 7/2003 | Ceroll et al. |
| 5,471,888 | A | 12/1995 | McCormick | D478,917 | S | 8/2003 | Ceroll et al. |
| 5,480,009 | A | 1/1996 | Wieland et al. | 6,601,493 | B1 | 8/2003 | Crofutt |
| 5,503,059 | A | 4/1996 | Pacholok | 6,607,015 | B1 | 8/2003 | Chen |
| 5,510,685 | A | 4/1996 | Grasselli | D479,538 | S | 9/2003 | Welsh et al. |
| 5,513,548 | A | 5/1996 | Garuglieri | 6,617,720 | B1 | 9/2003 | Egan, III et al. |
| 5,534,836 | A | 7/1996 | Schenkel et al. | 6,619,348 | B2 | 9/2003 | Wang |
| 5,572,916 | A | 11/1996 | Takano | 6,640,683 | B2 | 11/2003 | Lee |
| 5,587,618 | A | 12/1996 | Hathaway | 6,644,157 | B2 | 11/2003 | Huang |
| 5,592,353 | A | 1/1997 | Shinohara et al. | 6,647,847 | B2 | 11/2003 | Hewitt et al. |
| 5,606,889 | A | 3/1997 | Bielinski et al. | 6,659,233 | B2 | 12/2003 | DeVlieg |
| 5,623,860 | A | 4/1997 | Schoene et al. | 6,736,042 | B2 | 5/2004 | Behne et al. |
| 5,648,644 | A | 7/1997 | Nagel | 6,742,430 | B2 | 6/2004 | Chen |
| 5,659,454 | A | 8/1997 | Vermesse | 6,813,983 | B2 * | 11/2004 | Gass et al. ............ 83/62.1 |
| 5,667,152 | A | 9/1997 | Mooring | 6,826,988 | B2 | 12/2004 | Gass et al. |
| 5,671,633 | A | 9/1997 | Wagner | 6,857,345 | B2 | 2/2005 | Gass et al. |
| 5,695,306 | A | 12/1997 | Nygren, Jr. | 6,874,397 | B2 | 4/2005 | Chang |
| 5,700,165 | A | 12/1997 | Harris et al. | 6,874,399 | B2 | 4/2005 | Lee |
| 5,724,875 | A | 3/1998 | Meredith et al. | 6,922,153 | B2 | 7/2005 | Pierga et al. |
| 5,730,165 | A | 3/1998 | Philipp | 7,347,131 | B2 | 3/2008 | Gass |
| 5,741,048 | A | 4/1998 | Eccleston | 7,373,863 | B2 | 5/2008 | O'Banion et al. |
| 5,755,148 | A | 5/1998 | Stumpf et al. | 7,421,932 | B1 | 9/2008 | Heinzmann et al. |
| 5,771,742 | A | 6/1998 | Bokaie et al. | 2001/0032534 | A1 | 10/2001 | Ceroll et al. |
| 5,782,001 | A | 7/1998 | Gray | 2002/0017179 | A1 | 2/2002 | Gass et al. |
| 5,787,779 | A | 8/1998 | Garuglieri | 2002/0059853 | A1 | 5/2002 | Gass et al. |
| 5,791,057 | A | 8/1998 | Nakamura et al. | 2002/0059854 | A1 | 5/2002 | Gass et al. |
| 5,791,223 | A | 8/1998 | Lanzer | 2002/0059855 | A1 | 5/2002 | Gass et al. |
| 5,791,224 | A | 8/1998 | Suzuki et al. | 2002/0066346 | A1 | 6/2002 | Gass et al. |
| 5,791,441 | A | 8/1998 | Matos et al. | 2002/0096030 | A1 | 7/2002 | Wang |
| 5,819,619 | A | 10/1998 | Miller et al. | 2002/0109036 | A1 | 8/2002 | Denen et al. |
| 5,852,951 | A | 12/1998 | Santi | 2003/0005588 | A1 | 1/2003 | Gass et al. |
| 5,861,809 | A | 1/1999 | Eckstein et al. | 2003/0019341 | A1 | 1/2003 | Gass et al. |
| 5,875,698 | A | 3/1999 | Ceroll et al. | 2003/0020336 | A1 | 1/2003 | Gass et al. |
| 5,921,367 | A | 7/1999 | Kashioka et al. | 2003/0037651 | A1 | 2/2003 | Gass et al. |
| 5,930,096 | A | 7/1999 | Kim | 2003/0037655 | A1 | 2/2003 | Chin-Chin |
| 5,937,720 | A | 8/1999 | Itzov | 2003/0056853 | A1 | 3/2003 | Gass et al. |
| 5,942,975 | A | 8/1999 | Sorensen | 2003/0074873 | A1 | 4/2003 | Freiberg et al. |
| 5,943,932 | A | 8/1999 | Sberveglieri | 2003/0089212 | A1 | 5/2003 | Parks et al. |
| 5,950,514 | A | 9/1999 | Benedict et al. | 2003/0101857 | A1 | 6/2003 | Chuang |
| 5,963,173 | A | 10/1999 | Lian et al. | 2003/0109798 | A1 | 6/2003 | Kermani |
| 5,974,927 | A | 11/1999 | Tsune | 2004/0011177 | A1 | 1/2004 | Huang |
| 5,989,116 | A | 11/1999 | Johnson et al. | 2004/0060404 | A1 | 4/2004 | Metzger, Jr. |
| 6,018,284 | A | 1/2000 | Rival et al. | 2004/0104085 | A1 | 6/2004 | Lang et al. |
| 6,037,729 | A | 3/2000 | Woods et al. | 2004/0159198 | A1 | 8/2004 | Peot et al. |
| 6,052,884 | A | 4/2000 | Steckler et al. | 2004/0194594 | A1 | 10/2004 | Dils et al. |
| 6,095,092 | A | 8/2000 | Chou | 2004/0200329 | A1 | 10/2004 | Sako |
| 6,119,984 | A | 9/2000 | Devine | 2004/0226424 | A1 | 11/2004 | O'Banion et al. |
| 6,133,818 | A | 10/2000 | Hsieh et al. | 2004/0226800 | A1 | 11/2004 | Pierga et al. |
| 6,141,192 | A | 10/2000 | Garzon | 2005/0057206 | A1 | 3/2005 | Uneyama |
| 6,148,504 | A | 11/2000 | Schmidt et al. | 2005/0092149 | A1 | 5/2005 | Hartmann |
| 6,150,826 | A | 11/2000 | Hokodate et al. | 2005/0139051 | A1 | 6/2005 | Gass et al. |
| 6,170,370 | B1 | 1/2001 | Sommerville | 2005/0139056 | A1 | 6/2005 | Gass et al. |
| 6,244,149 | B1 | 6/2001 | Ceroll et al. | 2005/0139057 | A1 | 6/2005 | Gass et al. |
| 6,257,061 | B1 | 7/2001 | Nonoyama et al. | 2005/0139058 | A1 | 6/2005 | Gass et al. |
| 6,352,137 | B1 | 3/2002 | Stegall et al. | 2005/0139459 | A1 | 6/2005 | Gass et al. |
| 6,366,099 | B1 | 4/2002 | Reddi | 2005/0178259 | A1 | 8/2005 | Gass et al. |
| 6,376,939 | B1 | 4/2002 | Suzuki et al. | 2005/0268767 | A1 | 12/2005 | Pierga et al. |
| 6,404,098 | B1 | 6/2002 | Kayama et al. | 2006/0096425 | A1 | 5/2006 | Keller |
| 6,405,624 | B2 | 6/2002 | Sutton | 2008/0134852 | A1 | 6/2008 | Gass et al. |
| 6,418,829 | B1 | 7/2002 | Pilchowski | 2008/0173147 | A1 | 7/2008 | Kovarik et al. |
| 6,420,814 | B1 | 7/2002 | Bobbio | 2008/0282858 | A1 | 11/2008 | Gass |
| 6,427,570 | B1 | 8/2002 | Miller et al. | | | | |
| 6,430,007 | B1 | 8/2002 | Jabbari | | | FOREIGN PATENT DOCUMENTS | |
| 6,431,425 | B1 | 8/2002 | Moorman et al. | DE | | 76186 | 8/1921 |
| 6,450,077 | B1 | 9/2002 | Ceroll et al. | DE | | 2800403 | 7/1979 |
| 6,453,786 | B1 | 9/2002 | Ceroll et al. | DE | | 3427733 | 1/1986 |

| | | |
|---|---|---|
| DE | 4235161 | 5/1993 |
| DE | 4326313 | 2/1995 |
| DE | 19609771 | 6/1998 |
| DE | 20102704 | 2/2001 |
| EP | 146460 | 11/1988 |
| EP | 0362937 | 4/1990 |
| ES | 2152184 | 1/2001 |
| FR | 2556643 | 6/1985 |
| FR | 2570017 | 3/1986 |
| GB | 598204 | 2/1948 |
| GB | 2096844 | 10/1982 |
| GB | 2142571 | 1/1985 |
| WO | WO 03/006213 | 1/2003 |

OTHER PUBLICATIONS

U.S. Appl. No. 60/157,340, filed Oct. 1, 1999, entitled "Fast-Acting Safety Stop."

*You Should Have Invented It*, French television show DVD, date unknown.

* cited by examiner

MITER SAW WITH SAFETY SYSTEM

CROSS-REFERENCE TO RELATED APPLICATIONS

This application is a continuation of U.S. patent application Ser. No. 12/220,946 filed Jul. 29, 2008 and issuing as U.S. Pat. No. 7,698,976 on Apr. 20, 2010. That application, in turn, is a continuation of U.S. patent application Ser. No. 09/929,238 filed Aug. 13, 2001, now abandoned, which in turn claimed the benefit of and priority from the following U.S. Provisional Patent Applications: Ser. No. 60/225,056, filed Aug. 14, 2000, Ser. No. 60/225,057, filed Aug. 14, 2000, Ser. No. 60/225,058, filed Aug. 14, 2000, Ser. No. 60/225,059, filed Aug. 14, 2000, Ser. No. 60/225,089, filed Aug. 14, 2000, Ser. No. 60/225,094, filed Aug. 14, 2000, Ser. No. 60/225,169, filed Aug. 14, 2000, Ser. No. 60/225,170, filed Aug. 14, 2000, Ser. No. 60/225,200, filed Aug. 14, 2000, Ser. No. 60/225,201, filed Aug. 14, 2000, Ser. No. 60/225,206, filed Aug. 14, 2000, Ser. No. 60/225,210, filed Aug. 14, 2000, Ser. No. 60/225,211, filed Aug. 14, 2000, and Ser. No. 60/225,212, filed Aug. 14, 2000. The disclosures of all these applications are hereby incorporated by reference.

FIELD

The present invention relates to miter saws, and more particularly to a miter saw with a high-speed safety system.

BACKGROUND

Miter saws are a type of woodworking machinery used to cut workpieces of wood, plastic and other materials. Miter saws include a base upon which workpieces are placed, and a circular saw blade is mounted on a swing arm above the base. A person uses a miter saw by placing workpiece on the base beneath the blade and then bringing the blade down via the swing arm to cut the workpiece. Miter saws present a risk of injury to users because the spinning blade is often exposed when in use. Furthermore, persons often use their hands to position and support workpieces beneath the blade, which increases the chance that an injury will occur.

The present invention provides a miter saw with an improved safety system that is adapted to detect the occurrence of one or more dangerous, or triggering, conditions during use of the miter saw, such as when a user's body contacts the spinning saw blade. When such a condition occurs, the safety system is actuated to limit or even prevent serious injury to the user.

DETAILED DESCRIPTION

Figure 1:
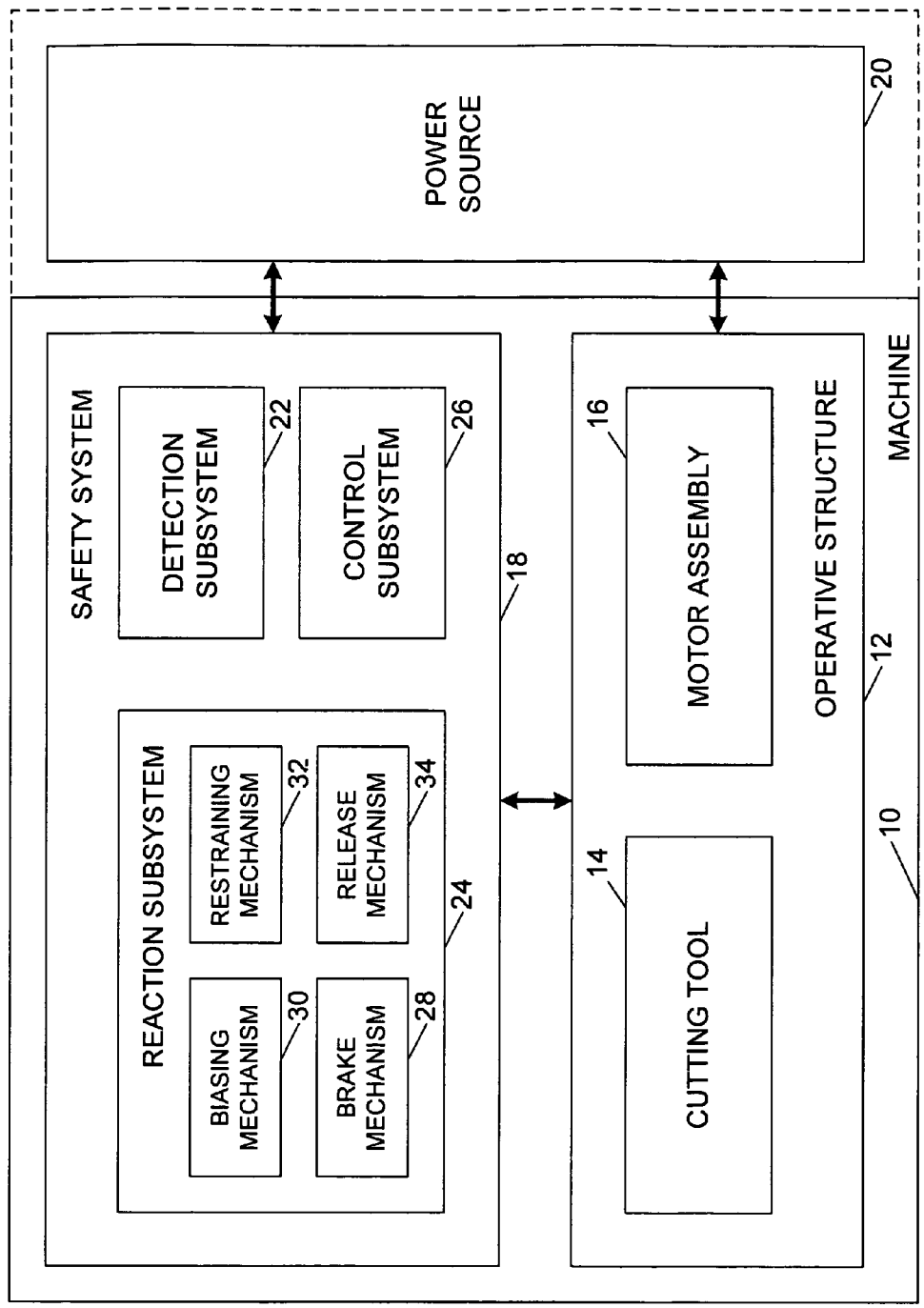
FIG. 1 is a schematic block diagram of a machine with a fast-acting safety system according to the present invention.

A machine is shown schematically in FIG. 1 and indicated generally at 10. Machine 10 may be any of a variety of different machines adapted for cutting workpieces, such as wood, including a table saw, miter saw (chop saw), radial arm saw, circular saw, band saw, jointer, planer, etc. Machine 10 includes an operative structure 12 having a cutting tool 14 and a motor assembly 16 adapted to drive the cutting tool. Machine 10 also includes a safety system 18 configured to minimize the potential of a serious injury to a person using machine 10. Safety system 18 is adapted to detect the occurrence of one or more dangerous, or triggering, conditions during use of machine 10. If such a dangerous condition is detected, safety system 18 is adapted to engage operative structure 12 to limit any injury to the user caused by the dangerous condition.

Machine 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of machine 10.

It will be appreciated that operative structure 12 may take any one of many different forms, depending on the type of machine 10. For example, operative structure 12 may include a stationary housing configured to support motor assembly 16 in driving engagement with cutting tool 14. Alternatively, operative structure 12 may include a movable structure configured to carry cutting tool 14 between multiple operating positions. As a further alternative, operative structure 12 may include one or more transports mechanisms adapted to convey a workpiece toward and/or away from cutting tool 14.

Motor assembly 16 includes one or more motors adapted to drive cutting tool 14. The motors may be either directly or indirectly coupled to the cutting tool, and may also be adapted to drive workpiece transport mechanisms. Cutting tool 14 typically includes one or more blades or other suitable cutting implements that are adapted to cut or remove portions from the workpieces. The particular form of cutting tool 14 will vary depending upon the various embodiments of machine 10. For example, in table saws, miter saws, circular saws and radial arm saws, cutting tool 14 will typically include one or more circular rotating blades having a plurality of teeth disposed along the perimetrical edge of the blade. For a jointer or planer, the cutting tool typically includes a plurality of radially spaced-apart blades. For a band saw, the cutting tool includes an elongate, circuitous tooth-edged band.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of machine 10. In addition, control subsystem 26 typically includes one or more instruments operable by a user to control the machine. The control subsystem is configured to control machine 10 in response to the inputs it receives.

Detection subsystem 22 is configured to detect one or more dangerous, or triggering, conditions during use of machine 10. For example, the detection subsystem may be configured to detect that a portion of the user's body is dangerously close to, or in contact with, a portion of cutting tool 14. As another example, the detection subsystem may be configured to detect the rapid movement of a workpiece due to kickback by the cutting tool, as is described in U.S. Provisional Patent Application Ser. No. 60/182,866, filed Feb. 16, 2000 entitled "Fast-Acting Safety Stop," the disclosure of which is herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of machine 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, or retract the cutting tool from its operating position, etc. The reaction subsystem may be configured to take a combination of steps to protect the user from serious injury. Placement of a barrier between the cutting tool and teeth is described in more detail in U.S. Provisional Patent Application Ser. No. 60/225,206, filed Aug. 14, 2000, entitled "Cutting Tool Safety System," and U.S. Patent Application Publication No. 2002-0017183-A1, the disclosures of which are herein incorporated by reference. Retraction of the cutting tool from its operating position is described in more detail in U.S. Provisional Patent Application Ser. No. 60/225,089, filed Aug. 14, 2000, entitled "Retraction System For Use In Power Equipment," and U.S. Patent Application Publication No. 2002-0017181-A1, the disclosures of which are herein incorporated by reference.

The configuration of reaction subsystem 24 typically will vary depending on which action(s) are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of machine 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
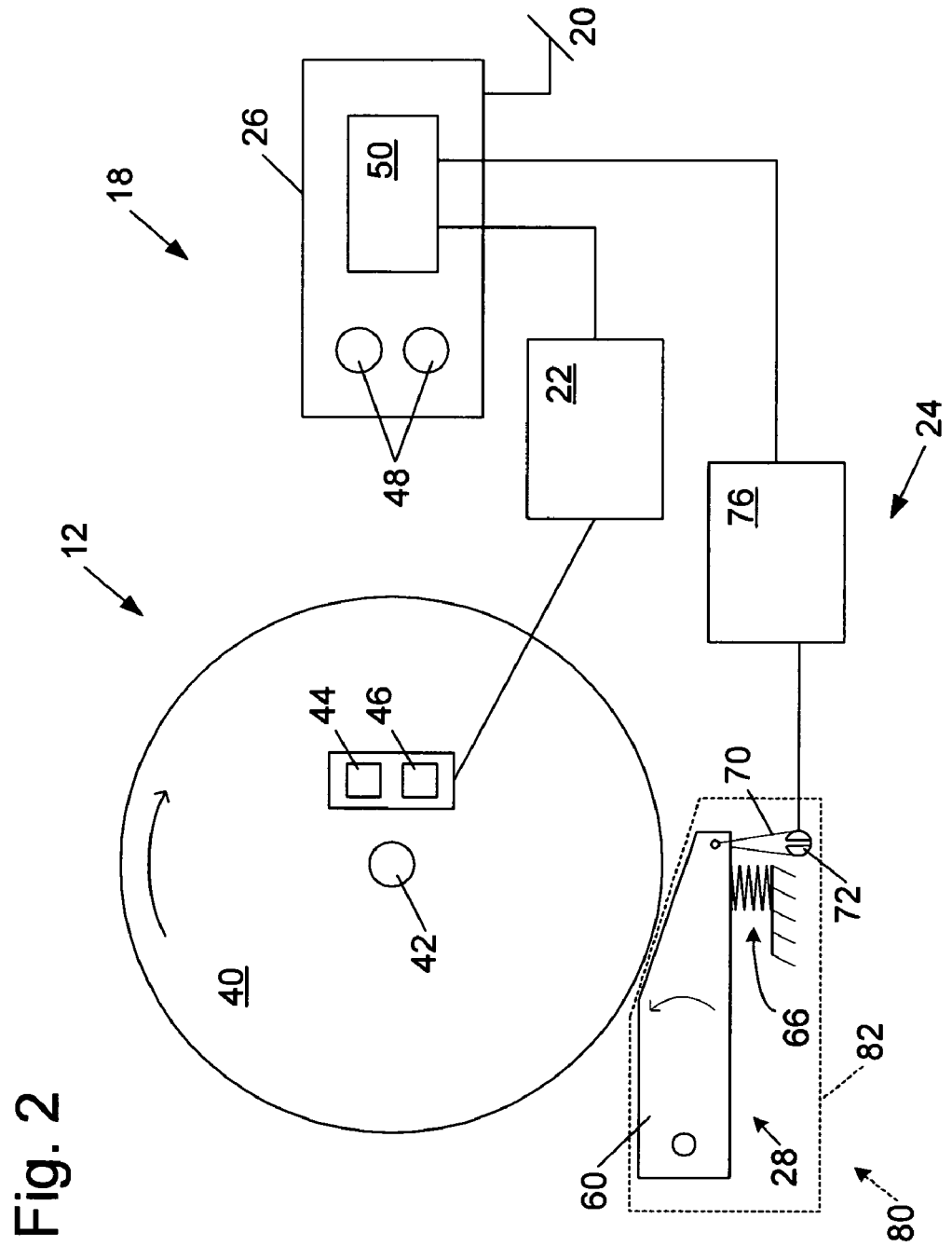
FIG. 2 is a schematic diagram of an exemplary safety system in the context of a machine having a circular blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of safety system 18 is shown. System 18 is configured to engage an operative structure having a cutting tool in the form of a circular blade 40 mounted on a rotating shaft or arbor 42. Blade 40 includes a plurality of cutting teeth (not shown) disposed around the outer edge of the blade. As described in more detail below, braking mechanism 28 is adapted to engage the teeth of blade 40 and stop the rotation of the blade. U.S. Provisional Patent Application Ser. No. 60/225,210, filed Aug. 14, 2000, entitled "Translation Stop For Use In Power Equipment," and U.S. Patent Application Publication No. 2002-0017175-A1, the disclosures of which are herein incorporated by reference, describe other systems for stopping the movement of the cutting tool. U.S. Provisional Patent Application Ser. No. 60/225,058, filed Aug. 14, 2000, entitled "Table Saw With Improved Safety System," and U.S. Patent Application Publication No. 2002-0017184-A1, the disclosures of which are herein incorporated by reference, describe safety system 18 in the context of a table saw.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14 is electrically isolated from the remainder of machine 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail in U.S. Provisional Patent Application Ser. No. 60/225,200, filed Aug. 14, 2000, entitled "Contact Detection System For Power Equipment," U.S. Patent Application Publication No. 2002-0017176-A1, U.S. Provisional Patent Application Ser. No. 60/225,211, filed Aug. 14, 2000, entitled "Apparatus And Method For Detecting Dangerous Conditions In Power Equipment," and U.S. Patent Application Publication No. 2002-0017336-A1, the disclosures of which are herein incorporated by reference.

Control subsystem 26 includes one or more instruments 48 that are operable by a user to control the motion of blade 40. Instruments 48 may include start/stop switches, speed controls, direction controls, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, workpiece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26 are described in more detail in U.S. Provisional Patent Application Ser. No. 60/225,059, filed Aug. 14, 2000, entitled "Logic Control For Fast-Acting Safety System," U.S. Patent Application Publication No. 2002-0020262-A1, U.S. Provisional Patent Application Ser. No. 60/225,094, filed Aug. 14, 2000, entitled "Motion Detecting System For Use In Safety System For Power Equipment," and U.S. Patent Application Publication No. 2002-0017178-A1, the disclosures of which are herein incorporated by reference.

In the exemplary implementation, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW) or Acrylonitrile Butadiene Styrene (ABS), etc., or a metal such as aluminum, etc. It will be appreciated that the construction of pawl 60 will vary depending on the configuration of blade 40. In any event, the pawl is urged into the blade by a biasing mechanism in the form of a spring 66. In the illustrative embodiment shown in FIG. 2, pawl 60 is pivoted into the teeth of blade 40. It should be understood that sliding or rotary movement of pawl 60 may also be used. The spring is adapted to urge pawl 60 into the teeth of the blade with sufficient force to grip the blade and quickly bring it to a stop.

The pawl is held away from the edge of the blade by a restraining mechanism in the form of a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably, fusible member 70 holds the pawl relatively close to the edge of the blade to reduce the distance the pawl must travel to engage the blade. Positioning the pawl relatively close to the edge of the blade reduces the time required for the pawl to engage and stop the blade. Typically, the pawl is held approximately 1/32-inch to 1/4-inch from the edge of the blade by fusible member 70, however other pawl-to-blade spacings may also be used within the scope of the invention.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Provisional Patent Application Ser. No. 60/225,056, filed Aug. 14, 2000, entitled "Firing Subsystem For Use In A Fast-Acting Safety System," U.S. Patent Application Publication No. 2002-0020263-A1, U.S. Provisional Patent Application Ser. No. 60/225,170, filed Aug. 14, 2000, entitled "Spring-Biased Brake Mechanism For Power Equipment," U.S. Patent Application Publication No. 2002-0020271-A1, U.S. Provisional Patent Application Ser. No. 60/225,169, filed Aug. 14, 2000, entitled "Brake Mechanism For Power Equipment," and U.S. Patent Application Publication No. 2002-0017180-A1, the disclosures of which are herein incorporated by reference.

It will be appreciated that activation of the brake mechanism will typically require the replacement of one or more portions of safety system 18. For example, pawl 60 and fusible member 70 typically must be replaced before the safety system is ready to be used again. Thus, it may be desirable to construct one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge are described in more detail in U.S. Provisional Patent Application Ser. No. 60/225,201, filed Aug. 14, 2000, entitled "Replaceable Brake Mechanism For Power Equipment," U.S. Patent Application Publication No. 2002-0020261-A1, U.S. Provisional Patent Application Ser. No. 60/225,212, filed Aug. 14, 2000, entitled "Brake Positioning System," and U.S. Patent Application Publication No. 2002-0017182-A1, the disclosures of which are herein incorporated by reference.

While one particular implementation of safety system 18 has been described, it will be appreciated that many variations and modifications are possible within the scope of the invention. Many such variations and modifications are described in U.S. Provisional Patent Applications Ser. Nos. 60/182,866, filed Feb. 16, 2000, and 60/157,340, filed Oct. 1, 1999, both entitled "Fast-Acting Safety Stop," the disclosures of which are herein incorporated by reference.

Figure 3:
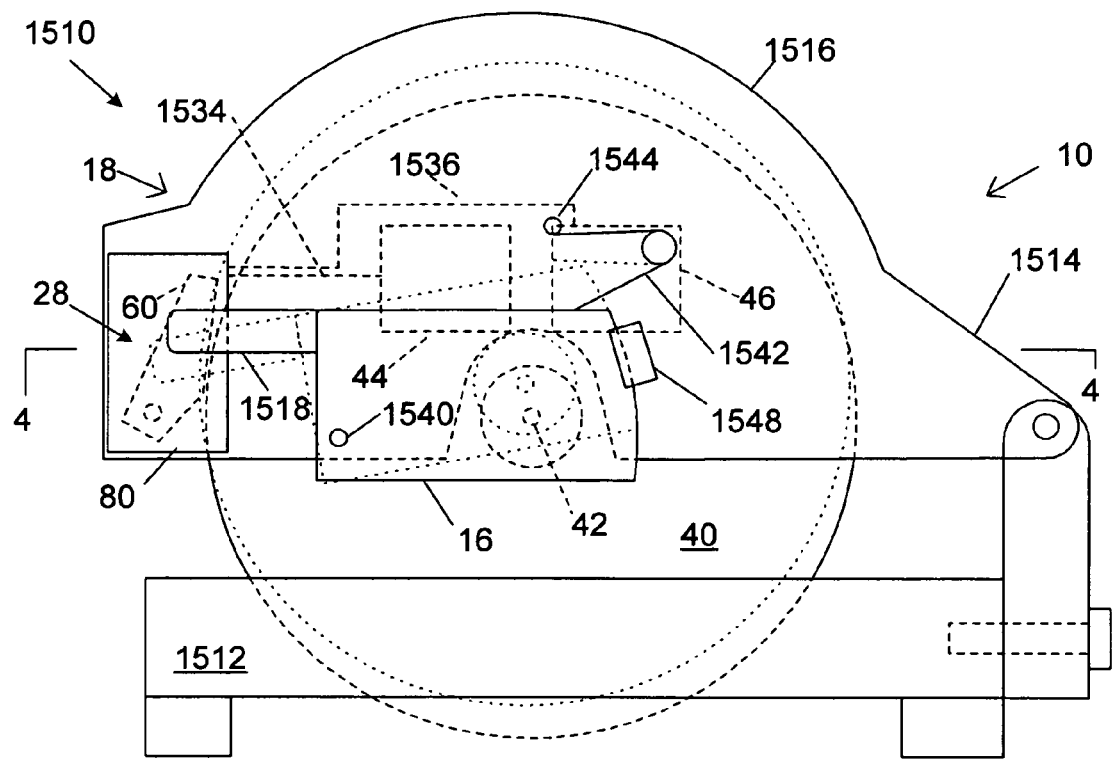
FIG. 3 is a side elevation view of a miter saw with an improved safety system according to the present invention.
Figure 4:
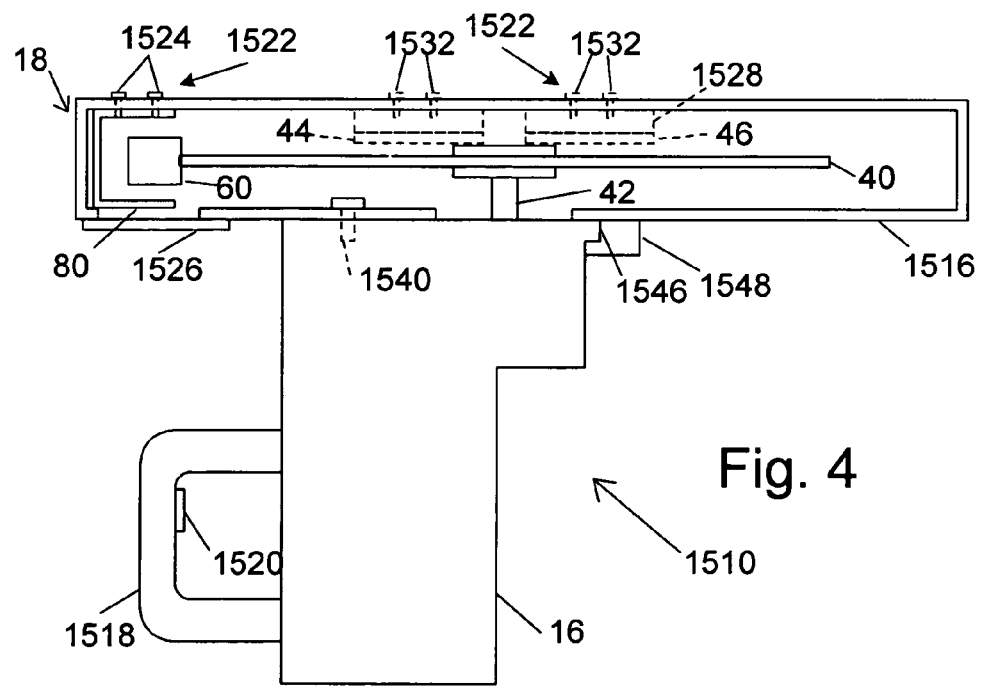
FIG. 4 is a cross-sectional top plan view of the miter saw of FIG. 3.

In FIGS. 3 and 4, an exemplary embodiment of machine 10 is shown in the context of a miter saw 1510, which is also commonly referred to as a chop saw. It will be understood that miter saw 1510 may be any type of miter saw including a simple miter saw, compound miter saw, sliding compound miter saw, etc. Typically, miter saw 1510 includes a base or stand 1512 adapted to hold the workpiece to be cut. A swing arm 1514 is pivotally coupled to base 1512 to allow the arm to pivot downward toward the base. Attached to arm 1514 is a housing 1516 adapted to at least partially enclose a circular blade 40. A motor assembly 16 is coupled to the housing, and includes a rotating arbor 42 on which the blade is mounted. Motor assembly 16 includes a handle 1518 with a trigger 1520 operable to run the saw. Blade 40 rotates downward toward base 1512. An optional blade guard (not shown) may extend from the bottom of housing 1516 to cover any portion of the blade exposed from the housing. A person uses miter saw 1510 by placing workpiece on base 1512 beneath the upraised blade and then bringing the blade down via swing arm 1514 into what may be thought of as a cutting zone to cut the workpiece. It should be understood that various embodiments of miter saws with improved safety systems are disclosed herein and include various elements, sub-elements, features and variations. Miter saws according to the present invention may include any one or more of the elements, sub-elements, features and variations disclosed herein, regardless of whether the particular elements, sub-elements, features and/or variations are described together or shown together in the figures.

Figure 9:
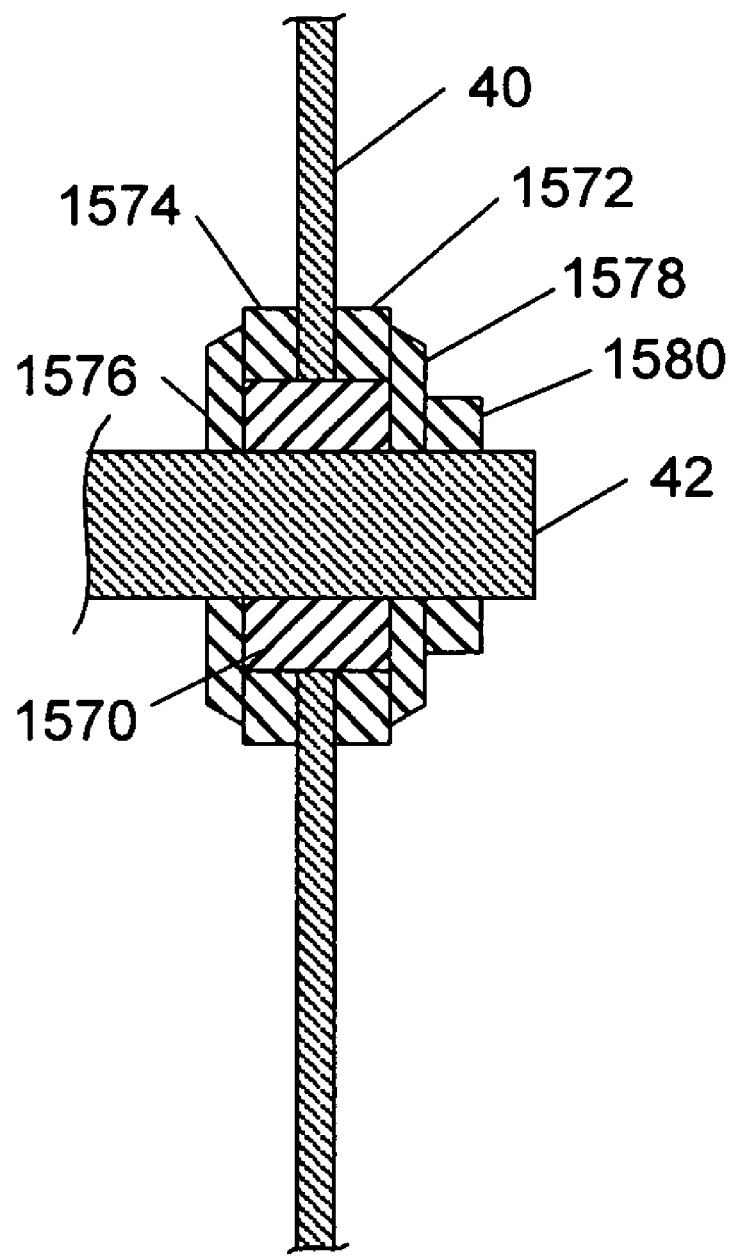
FIG. 9 is a fragmentary cross-sectional view of an electrically isolated blade.

The portion of saw 1510 from which sensors 44 and 46 detect contact with a user should be electrically isolated from ground and the remaining portion of saw 1510 to allow an input signal to be capacitively coupled from one plate to the other. For example, blade 40 may be electrically isolated from the rest of the saw via a plastic or other nonconductive bushing, such as shown in FIG. 9 at 1570. Alternatively, the blade and arbor assembly may be electrically isolated. Also shown in FIG. 9 are insulating washers 1572 and 1574 that isolate blade 40 from arbor flange 1576 and arbor washer 1578. The insulating washers should be sufficiently thick that only negligible capacitance is created between the blade and the grounded arbor flange and washer. A typical thickness is approximately 1/8-inch, although thicker or thinner washers may be used. In addition, some or all of the arbor components may be formed from non-conductive materials, such as ceramics, to reduce or eliminate the need for bushing 1570.

An arbor nut 1580 holds the entire blade assembly on arbor 42. Friction established by tightening the arbor nut allows torque from the arbor to be transmitted to the saw blade. It is preferable, although not essential, that the blade be able to slip slightly on the arbor in the event of a sudden stop by the brake to reduce the mass that must be stopped and decrease the chance of damage to the blade, arbor, and/or other components in the drive system of the saw. Alternatively, a threaded arbor bolt may be used in place of nut 1580. The arbor bolt has a threaded shaft that is received into arbor 40, and a head that retains the blade assembly on the arbor.

Furthermore, it may be desirable to construct the bushing from a material that is soft enough to deform when the blade is stopped suddenly. For example, depending on the type of braking system used, a substantial radial impact load may be transmitted to the arbor when the brake is actuated. A deformable bushing can be used to absorb some of this impact and reduce the chance of damage to the arbor. In addition, proper positioning of the brake in combination with a deformable bushing may be employed to cause the blade to move away from the user upon activation of the brake, as will be discussed in further detail below.

In an alternative embodiment, the arbor and/or part of its supporting framework is electrically isolated from ground instead of isolating the blade from the arbor. One benefit of this embodiment is that if the blade is electrically connected to the arbor, then the arbor itself can be used to capacitively couple the input signal from charge plate 44 to charge plate 46. An example of such a configuration is disclosed in U.S. Provisional Patent Application Ser. No. 60/182,866, filed Feb. 16, 2000, which is incorporated herein by reference.

Any of the various configurations and arrangements of safety system 18 described above may be implemented in miter saw 1510. In the exemplary embodiment depicted in FIGS. 3 and 4, safety system 18 is a cartridge-type system. With the exception of charging plates 44 and 46, both brake mechanism 28 and detection subsystem 22 are contained within cartridge 80. Examples of suitable cartridges 80 are disclosed in U.S. Provisional Patent Application Ser. No. 60/225,201, filed Aug. 14, 2000, entitled "Replaceable Brake Mechanism For Power Equipment," U.S. Patent Application Publication No. 2002-0020261-A1, U.S. Provisional Patent Application Ser. No. 60/225,212, filed Aug. 14, 2000, entitled "Brake Positioning System," and U.S. Patent Application Publication No. 2002-0017182-A1, the disclosures of which are incorporated by reference. The cartridge is configured to be mounted on the front inside surface of housing 1516 by any suitable fastening mechanism 1522, such as by one or more bolts 1524. The housing may include a movable panel or door 1526 to allow access to the cartridge. Alternatively, cartridge 80 may be inserted into a port or opening in the housing. A pawl 60 is mounted in the cartridge and is positionable in front of the blade. Examples of suitable pawls and brake mechanisms incorporating the same are disclosed in U.S. Provisional Patent Application Ser. No. 60/225,169, filed Aug. 14, 2000, entitled "Brake Mechanism For Power Equipment," U.S. Patent Application Publication No. 2002-0017180-A1, U.S. Provisional Patent Application Ser. No. 60/225,170, filed Aug. 14, 2000, entitled "Spring-Biased Brake Mechanism For Power Equipment," and U.S. Patent Application Publication No. 2002-0020271-A1, the disclosures of which are incorporated by reference. It should be understood that cartridge 80 is not essential to all embodiments of the miter saw disclosed herein and that miter saw 1510 may be implemented without requiring a cartridge. Instead, the brake mechanism of the safety system may be mounted in any suitable operative position relative to blade 40 without being housed in a cartridge.

Charge plates 44 and 46 are attached to the inside wall of housing 1516 by one or more mounts 1528. The mounts are attached to the housing by any suitable fastening mechanism 1522, such as by bolts 1532, and are configured to position the charge plates parallel to, and closely adjacent, blade 40. As shown in FIG. 4, the spacing between the charge plates and the blade is preferably much less than the spacing between the charge plates and the housing to minimize any parasitic capacitance between the charge plates and the housing. Alternatively, the housing may be constructed from an electrically non-conductive material.

Cables 1534 and 1536 connect the charge plates to safety system's electronics unit, which may be housed in the cartridge or elsewhere on the miter saw. Electrical power for safety system 18 is provided by any suitable source, such as a cable extending from motor assembly 16. In addition to actuating the engagement of the pawl with the blade, the electronics unit within cartridge 80 is also configured to interrupt the power to motor assembly 16 when contact between the user's body and the blade is detected.

A circular blade spinning at several thousand revolutions per minute possesses a substantial amount of angular momentum. Thus, when the pawl engages a circular blade such as is found on miter saw 1510 and stops the blade within a few milliseconds, the angular momentum must be transferred to the brake mechanism, including pawl 60. Because the swing arm of the miter saw is free to pivot in the direction of blade rotation, the angular momentum of the blade may be transferred to the swing arm when the blade is suddenly stopped, causing the swing arm to swing downward. This sudden and forceful downward movement of the swing arm may cause injury to the user if a portion of the user's body is beneath the blade. Therefore, an alternative embodiment of miter saw 1510 includes means for preventing the swing arm from moving downward when the blade is stopped. In addition, the pawl typically is mounted at the front of the miter saw to urge the blade to climb upward away from the user (i.e., deforming the plastic bushing) when engaged by the pawl.

Figure 5:
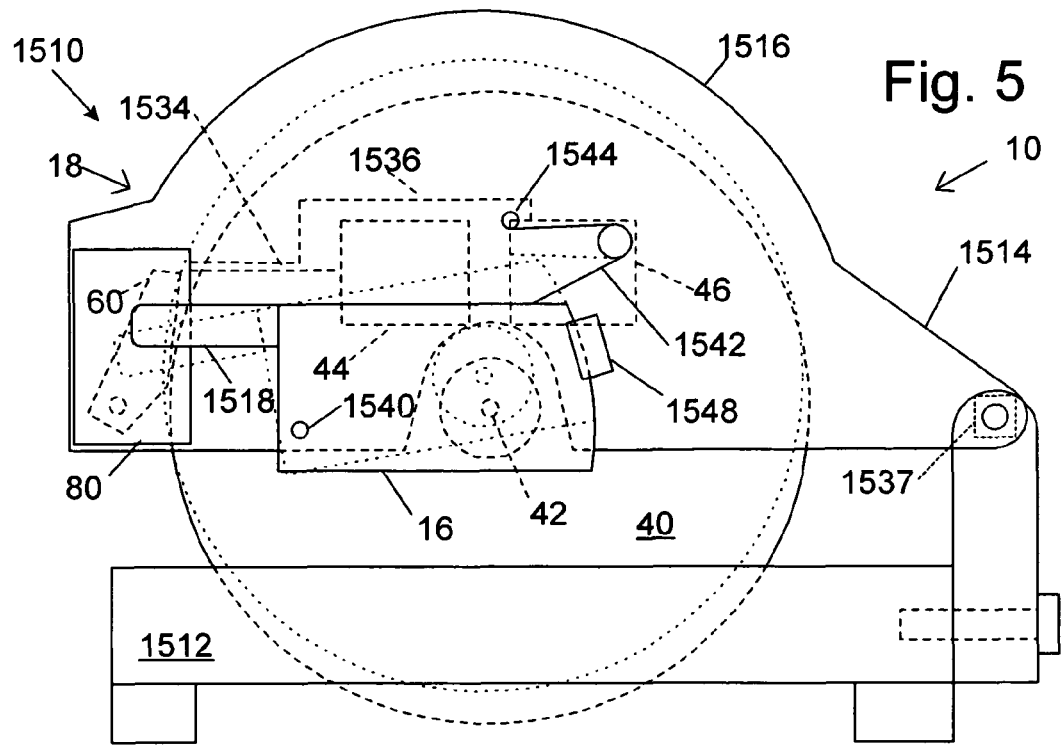
FIG. 5 is a side elevation view of another miter saw according to the present invention.
Figure 6:
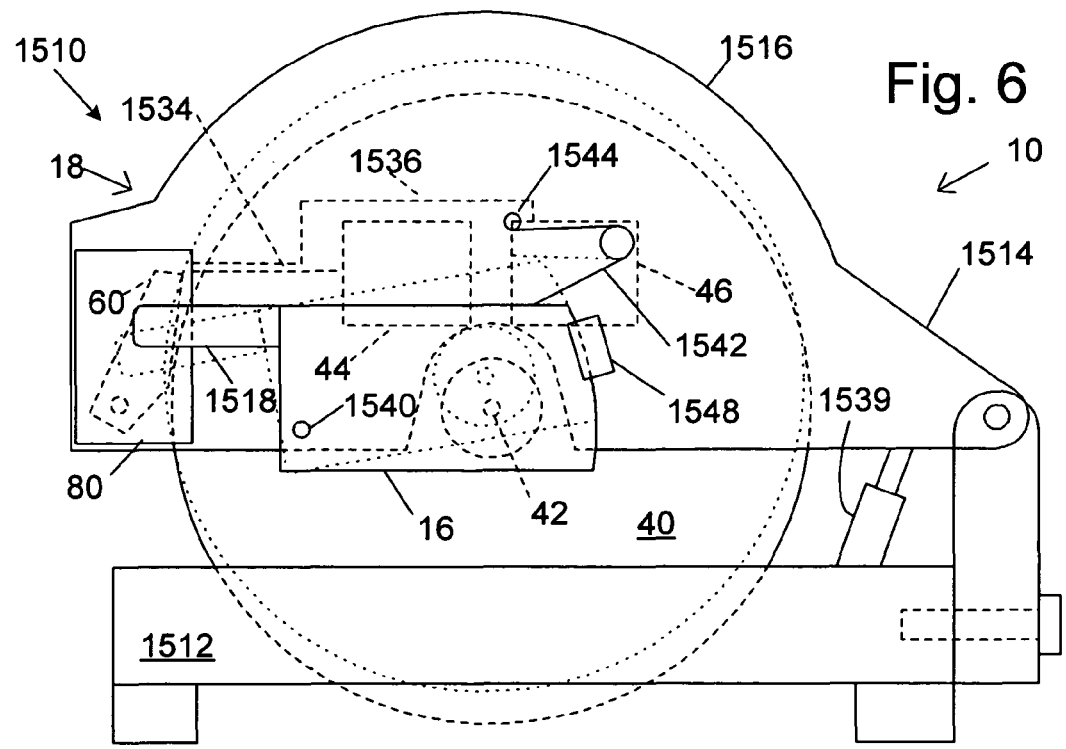
FIG. 6 is a side elevation view of another miter saw according to the present invention.

It will be appreciated that there are many suitable means for preventing sudden downward movement of the swing arm. For example, the pivotal connection between the swing arm and the base of the miter saw may be electrically lockable, for example using an electromagnetic leaf brake, to prevent the arm from pivoting. The signal to lock the connection may be provided by the detection system. An example of a miter saw with a lockable swing arm is shown in FIG. 5, in which an electromagnetic leaf brake is schematically illustrated at 1537. Alternatively, or additionally, a shock absorber may be connected between the swing arm and the base to limit the speed with which the swing arm can pivot relative to the base. This arrangement also serves to limit how far the blade moves between the time contact between the blade and user is detected, and the time the blade is stopped by the pawl. An example of a miter saw with a shock absorber 1539 is shown in FIG. 6 extending between the base and swing arm of the miter saw. While there are many other ways of connecting the swing arm to the base to prevent sudden movement of the arm toward the base, most such arrangements transfer the angular momentum to the swing arm/base assembly. Depending on the weight and balance of the saw, the angular momentum may be sufficient to cause the entire saw to overturn. Therefore, it may be desirable to secure the base to a stable surface with clamps, bolts, etc.

Alternatively, the miter saw can be configured to absorb any angular momentum without allowing the swing arm to move downward. For example, the exemplary embodiment depicted in FIGS. 3 and 4 is configured with a pivotal motor assembly to allow the blade to move upward into the housing upon engagement with the pawl. Motor assembly 16 is connected to housing 1516 via pivot bolt, or axle, 1540, allowing the motor assembly to pivot about bolt 1540 in the direction of blade rotation. A spring 1542 is compressed between the housing and an anchor 1544 to bias the motor assembly against the direction of blade rotation. The motor assembly may include a lip 1546, which slides against a flange 1548 on the housing to hold the end of the motor assembly opposite the pivot bolt against the housing.

When the saw is in use, spring 1542 holds the motor assembly in a normal position rotated fully counter to the direction of blade rotation. However, once the pawl is released to engage the blade, the motor assembly and blade to pivot upward against the bias of the spring. In this embodiment, the pawl is positioned at the front of the blade so that the pivot bolt 1540 is between the pawl and the arbor. This arrangement encourages the blade to move upward into the housing when stopped. The spring is selected to be sufficiently strong to hold the motor assembly down when cutting through a workpiece, but sufficiently compressible to allow the blade and motor assembly to move upward when the blade is stopped.

While one exemplary implementation of safety system 18 in the context of a miter saw has been described, the invention should not be seen as limited to any particular implementation as the configuration and arrangement of safety system 18 may vary among miter saws and applications. For example, the pivoting motor assembly configuration may also be combined with one or more of the other systems described above which prevent the swing arm from pivoting suddenly toward the base. Further, it will be appreciated that the blade and motor assembly may be configured in any of a variety of ways to at least partially absorb the angular momentum of the blade.

Figure 7:
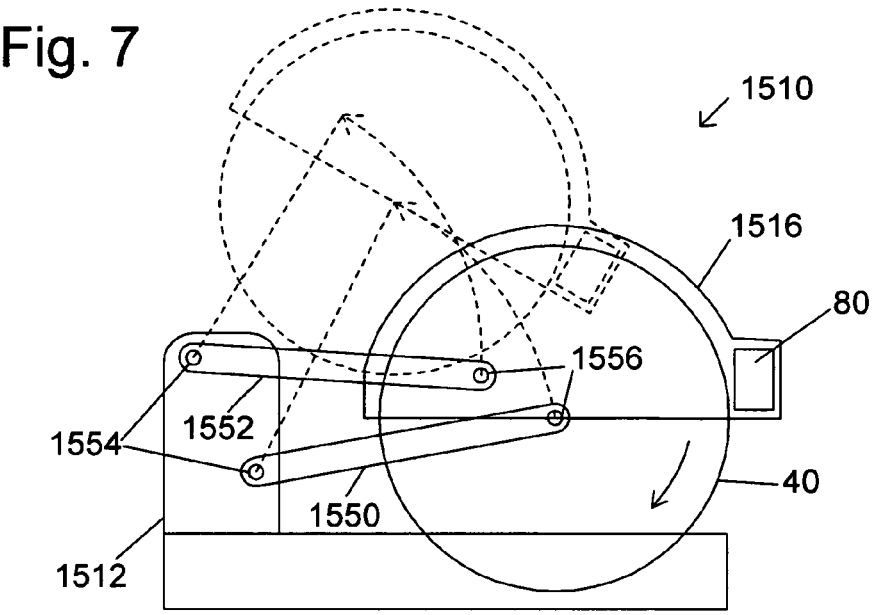
FIG. 7 is a side elevation view of another miter saw according to the present invention.

FIG. 7 shows an alternative configuration of miter saw 1510 adapted to absorb the angular momentum of the blade. In this configuration, the miter saw includes two swing arms 1550 and 1552. One end 1554 of each swing arm is connected to base 1512, and the opposite end 1556 of each swing arm is connected to housing 1516, blade 40, and/or the motor assembly (not shown). The position of the swing arms relative to each other may vary depending on the swing arm motion desired. In FIG. 7, swing arm 1550 is connected to base 1512 somewhat below and forward of swing arm 1552. Typically, the motor assembly is rigidly attached to end 1556 of swing arm 1550, while housing 1516 is connected to rotate about end 1556 of swing arm 1550. End 1556 of swing arm 1552 is connected only to the housing. This arrangement replicates the motion of the motor assembly and trigger found on many conventional miter saws. Alternatively, the motor assembly may be connected to rotate about end 1556 of swing arm 1550 along with the housing.

The configuration shown in FIG. 7 causes the housing and/or motor assembly to rotate as the swing arms pivot. Significantly, when the swing arms move upward, the housing and/or motor assembly rotates in the same direction in which the blade rotates during cutting. As a result, when the pawl engages the blade and transfers the angular momentum of the blade to the housing and/or motor assembly, the housing and/or motor assembly tend to rotate in the same direction as the blade. This causes the swing arms to pivot upward, drawing the blade away from the workpiece and the user's body. Thus, as described above, the miter saw configuration illustrated in FIG. 7 is adapted to absorb the angular momentum of the blade and translate that angular momentum into an upward force on the swing arm.

The configuration shown in FIG. 7 and described above illustrates a further alternative embodiment of a miter saw with safety system 18. Specifically, the safety system may be configured to move the blade of the cutting tool rapidly away from the user when contact with the user's body is detected in addition to, or instead of, stopping the blade. This alternative embodiment may be implemented in the context of any of the cutting tools described herein. For example, a table saw implemented with safety system 18 may include a swing arm adapted to pivot downward to pull the blade beneath the upper surface of the saw when a dangerous, or triggering, condition is detected, such as contact between the user and the blade while the blade is rotating. A spring (not shown) may be coupled to the swing arm to increase the speed with which it drops downward. It will be appreciated that similar implementations may be configured in the context of all the saws described herein. In the case of the miter saw, a electromagnetic leaf brake can be used to stop the movement of the arm upon contact with a user. In addition, the restraining mechanism can be used to release a spring to push the arm upward upon contact of the blade and user. With such systems, it may not be necessary to abruptly stop the blade to avoid injury.

Figure 8:
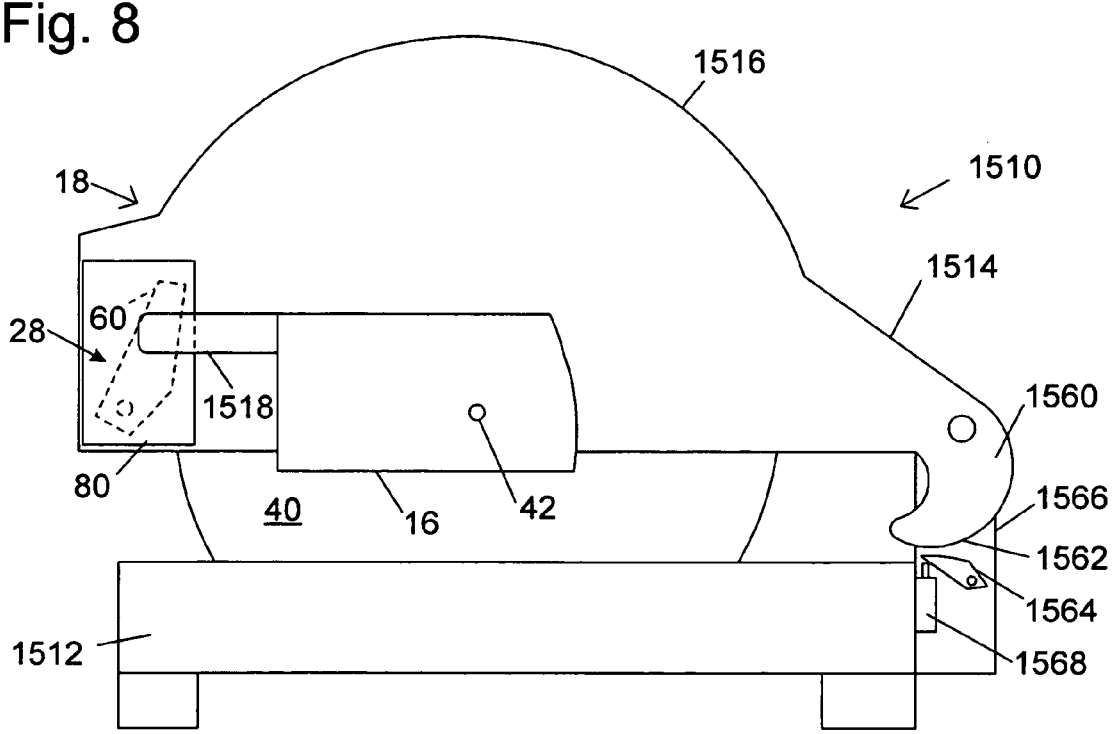
FIG. 8 is a side elevation view of another miter saw according to the present invention.

Another example of a miter saw 1510 constructed according to the present invention is shown in FIG. 8. As shown, saw 1510 illustrates another suitable mechanism for stopping the sudden downward movement of swing arm 1514 when safety system 18 is actuated and pawl 60 engages blade 40. Swing arm 1514 includes a cam portion 1560 having a cam surface 1562. Cam portion 1560 may be integral with the swing arm and housing 1516. A stopping pawl 1564 is mounted to vertical support 1566 adjacent cam surface 1562, and an actuator 1568 is positioned adjacent pawl 1564. The actuator is operatively coupled to the control and detection subsystems associated with brake pawl 60 and cartridge 80 so that when pawl brake pawl 60 is released, actuator 1568 engages stopping pawl 1564. During normal operation, actuator 1568 maintains the pawl spaced-apart from cam surface 1562. However, once contact between the blade and the user's body is detected, the detection system sends an actuation signal to actuator 1568, which may be the same or a different signal that triggers the release of brake pawl 60. In any event, upon receipt of the actuation signal, the actuator drives against stopping pawl 1564, causing it to pivot into cam surface 1562, preventing further movement of the swing arm. Stopping pawl 1564 may be constructed or coated with a high friction material such as rubber, and/or may be configured with teeth, etc., to increase its braking action. Cam portion 1560 may be modified so that it extends as far as possible from the point around which it pivots, in order to provide as great a moment arm as possible to help stop the downward motion of the swing arm.

Safety system 22 may also protect the user from injury by wrapping the blade with a protective surface upon detection of a dangerous, or triggering, condition. Alternatively, or additionally, system 22 may protect the user by disabling the teeth of the blade. Examples of these embodiments of safety system 22 are disclosed in U.S. Provisional Patent Application Ser. No. 60/225,206, filed Aug. 14, 2000, entitled "Cutting Tool Safety System," and U.S. Patent Application Publication No. 2002-0017183-A1, which are hereby incorporated by reference.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions.

Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A miter saw comprising:
a support structure having a cutting zone;
a swing arm above and pivotally attached to the support structure;
a rotatable blade supported by the swing arm;
a handle associated with the swing arm and adapted so that a user may grasp the handle to move the blade into the cutting zone;
a motor adapted to drive the blade;
a detection system adapted to detect contact between the blade and a person; and
a retraction mechanism adapted to pivot the blade away from the cutting zone upon detection by the detection system of the contact between the blade and the person.

2. A miter saw comprising:
a support structure having a cutting zone;
a swing arm above and movably attached to the support structure;
a rotatable blade supported by the swing arm;
a handle associated with the swing arm and adapted so that a user may grasp the handle to move the blade into the cutting zone;
a motor adapted to drive the blade;
a detection system adapted to detect contact between the blade and a person; and
retraction means for retracting the blade away from the cutting zone upon detection by the detection system of the contact between the blade and the person.

* * * * *